J. B. VAN DUZER & R. JOHNSTON.
CHAIN PUMP BUCKET.
No. 170,211. Patented Nov. 23, 1875.
Fig: 1.
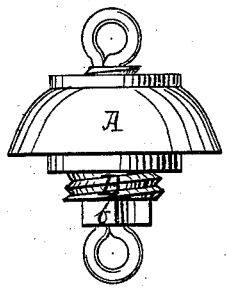
Fig: 2.
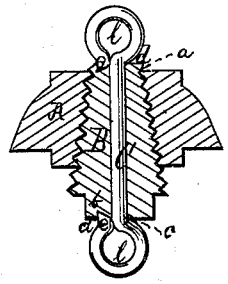
Witnesses:
Henry Eichling
B. S. Clark
Inventor:
Josiah B. Van Duzer
Riley Johnston
By Fitch & Fitch
Their Attys.
N. PETERS, PHOTO-LITHOGRAPHER, WASHINGTON, D. C.

UNITED STATES PATENT OFFICE.

JOSIAH B. VAN DUZER AND RILEY JOHNSTON, OF SHESHEQUIN, PA.

IMPROVEMENT IN CHAIN-PUMP BUCKETS.

Specification forming part of Letters Patent No. 170,211, dated November 23, 1875; application filed September 21, 1875.

*To all whom it may concern:*

Be it known that we, JOSIAH B. VAN DUZER and RILEY JOHNSTON, of Sheshequin, Bradford county, State of Pennsylvania, have invented an Improved Chain-Pump Bucket, of which the following is a specification, reference being had to the accompanying drawings, forming part hereof.

Our invention consists in a tapered metal screw, adjusted in a central opening through a rubber bucket for chain-pumps, the said screw being provided with a longitudinal central opening, through which passes a link of the chain, whereby any wear upon the rim of the bucket may be compensated by expanding the diameter of the bucket by means of the tapered screw.

Figure 1 is a front elevation of my improved chain-pump bucket. Fig. 2 is a longitudinal central sectional view of the same.

A is the rubber bucket, made in the usual form, with the central opening $a$ through it. B is the tapered screw, which is preferably made of iron, galvanized, and is screwed into the opening $a$ through the bucket, as shown. The said screw is formed with the post $b$ upon its butt-end, and has the longitudinal central opening $c$, through which is passed the shank of the link C. The ends $e$ of the loops $l$ on the outer extremities of the link may be embedded in depressions formed in the flat ends $d$ of the screw, as shown.

Now, it is evident that any wear upon the rim of the bucket A caused by its passage through the well-tube may be readily compensated by turning the tapered screw B farther through the central opening in the bucket, the bucket being thus expanded and its diameter increased. The screw may be conveniently turned by means of the post $b$ on its butt-end; or, the ends $e$ of the loops $l$ on the link C being embedded in depressions in the flat ends $d$, as described, the screw may be turned by either of the said loops.

What we claim as our invention, and desire to secure by Letters Patent, is—

The combination, as a chain-pump bucket, of the rubber bucket A, having the central opening $a$, the tapered screw B, and the link C, as described.

JOSIAH B. VAN DUZER.
RILEY JOHNSTON.

Witnesses:
ISAIAH JOHNSTON,
J. S. WILLISTON.